United States Patent [19]
Iino et al.

[11] Patent Number: 6,064,138
[45] Date of Patent: May 16, 2000

[54] ULTRASONIC WAVE MOTOR DEVICE AND ELECTRONIC APPARATUS HAVING ULTRASONIC WAVE MOTOR DEVICE

[75] Inventors: Akihiro Iino; Masao Kasuga; Kenji Suzuki, all of Chiba, Japan

[73] Assignee: Seiko Instruments Inc., Japan

[21] Appl. No.: 09/074,361

[22] Filed: May 7, 1998

[30] Foreign Application Priority Data

May 8, 1997 [JP] Japan ..................................... 9-117712
Apr. 20, 1998 [JP] Japan ................................. 10-109841

[51] Int. Cl.[7] .................................................. H02N 2/14
[52] U.S. Cl. ...................................................... 310/316.01
[58] Field of Search ......................... 310/316.01, 316.02, 310/316.03

[56] References Cited

U.S. PATENT DOCUMENTS

| | | | |
|---|---|---|---|
| 4,684,842 | 8/1987 | Maruno et al. .......................... | 310/316 |
| 4,940,914 | 7/1990 | Mizuno et al. .......................... | 326/323 |
| 5,461,273 | 10/1995 | Kawasaki et al. .................. | 310/316.01 |
| 5,592,041 | 1/1997 | Kasuga et al. .......................... | 310/316 |
| 5,619,089 | 4/1997 | Suzuki et al. ............................ | 310/323 |
| 5,661,359 | 8/1997 | Katsuragawa ...................... | 310/316.01 |
| 5,766,137 | 6/1998 | Omata ..................................... | 600/587 |
| 5,777,232 | 7/1998 | Kurita et al. ............................. | 73/664 |
| 5,780,955 | 7/1998 | Iino et al. ................................ | 310/316 |
| 5,783,897 | 7/1998 | Okaguchi ........................... | 310/316.01 |
| 5,902,931 | 5/1999 | Mori et al. ........................... | 73/504.12 |
| 5,920,144 | 7/1999 | Atsuta .................................. | 310/316.01 |

Primary Examiner—Thomas M. Dougherty
Attorney, Agent, or Firm—Adams & Wilks

[57] ABSTRACT

An ultrasonic wave motor device comprises an oscillating body having a piezo-electric element and a driving circuit for applying an exciting signal to the piezo-electric element to oscillate the oscillating body in self-excited oscillation. The driving circuit has an amplifying circuit for amplifying the exciting signal and a phase setting circuit for setting a phase of the exciting signal amplified by the amplifying circuit. A measuring device measures a characteristic of the driving circuit or a characteristic of the oscillating body. A phase adjusting circuit corrects a shift of the phase of the exciting signal in accordance with a measurement by the measuring device.

29 Claims, 9 Drawing Sheets

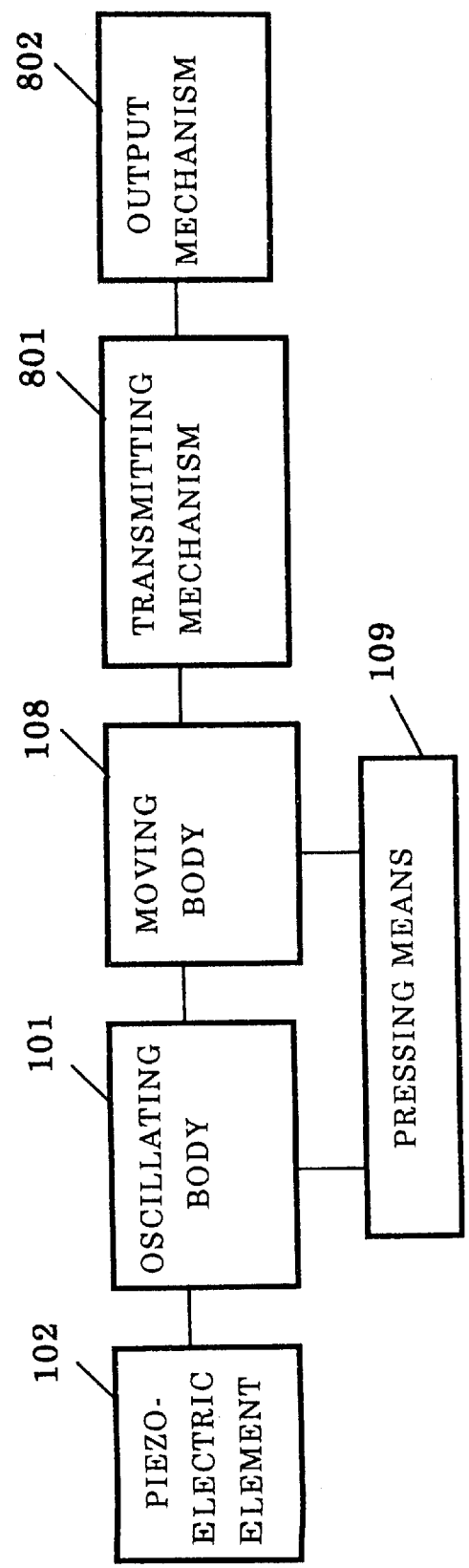

ULTRASONIC WAVE MOTOR DEVICE AND ELECTRONIC APPARATUS HAVING ULTRASONIC WAVE MOTOR DEVICE

BACKGROUND OF THE INVENTION

The present invention relates to an ultrasonic wave motor and, more specifically to an ultrasonic wave motor device in which, in accordance with a result of measuring a characteristic of an ultrasonic wave motor driving circuit or the ultrasonic wave motor device and analyzing the measured value, the driving circuit is corrected and the characteristic (stability, environmental reliability) is improved.

Conventionally, for example, as disclosed in Japanese Unexamined Patent Publication No. JP-A-62-92781, an ultrasonic wave motor driving circuit includes by a variable oscillating body, a 90û phase shifter, two power amplifiers, a current detector, and a voltage detector, a controlling circuit. The ultrasonic wave motor undergoes a change in a resonance frequency in respect to a change in temperature, load, power supply voltage or the like and, therefore, suffers from the problem in which a driving circuit per se is very complicated and large-sized.

In order to resolve the problem, there has been made a proposal as disclosed in, for example, Japanese Unexamined Patent Publication No. JP-A-8-107686 in which a driving circuit is constituted by a self-excited oscillation circuit comprising an amplifying circuit, a phase setting circuit and an ultrasonic wave motor having a piezo-electric body by which a total of the driving circuit is simplified and downsized.

However, according to a driving circuit as disclosed in Japanese Unexamined Patent Publication No. JP-A-8-107686, although a value of an element in respect of phase setting is determined based on a theoretical calculation, the problem of possibility of causing a difference in characteristics among respective products caused by a dispersion in characteristics of respective elements used in the ultrasonic wave motor driving circuit, a dispersion in the characteristic of the ultrasonic wave motor per se or the like, cannot be disregarded.

It is an object of the present invention to provide an ultrasonic wave motor device promoting characteristics (stability, environmental reliability) by simply enabling to correct the difference in the characteristic among the respective products in actual steps of fabricating the ultrasonic wave motor.

SUMMARY OF THE INVENTION

It is an object of the present invention to provide a constitution where the shift of the phase from a theoretical value can be corrected in the ultrasonic wave motor driving circuit constituted by the elements having the theoretically calculated values in view of circuit design and accordingly, wherein the characteristic of the ultrasonic wave motor device can be promoted and the dispersion of the individual devices can be reduced.

It is a further object of the present invention to provide an ultrasonic wave motor device wherein a stable operation can be carried out by a power supply having low power by installing a boosting circuit, and by which operation and stoppage of the ultrasonic wave motor device can simply be controlled by providing a stop signal generating circuit.

BRIEF DESCRIPTION OF THE DRAWINGS

FIG. 9 is a block diagram showing the constitution of a third embodiment of an electronic apparatus having an ultrasonic wave motor device according to the present invention.

DETAILED DESCRIPTION OF THE PREFERRED EMBODIMENTS

Figure 1:
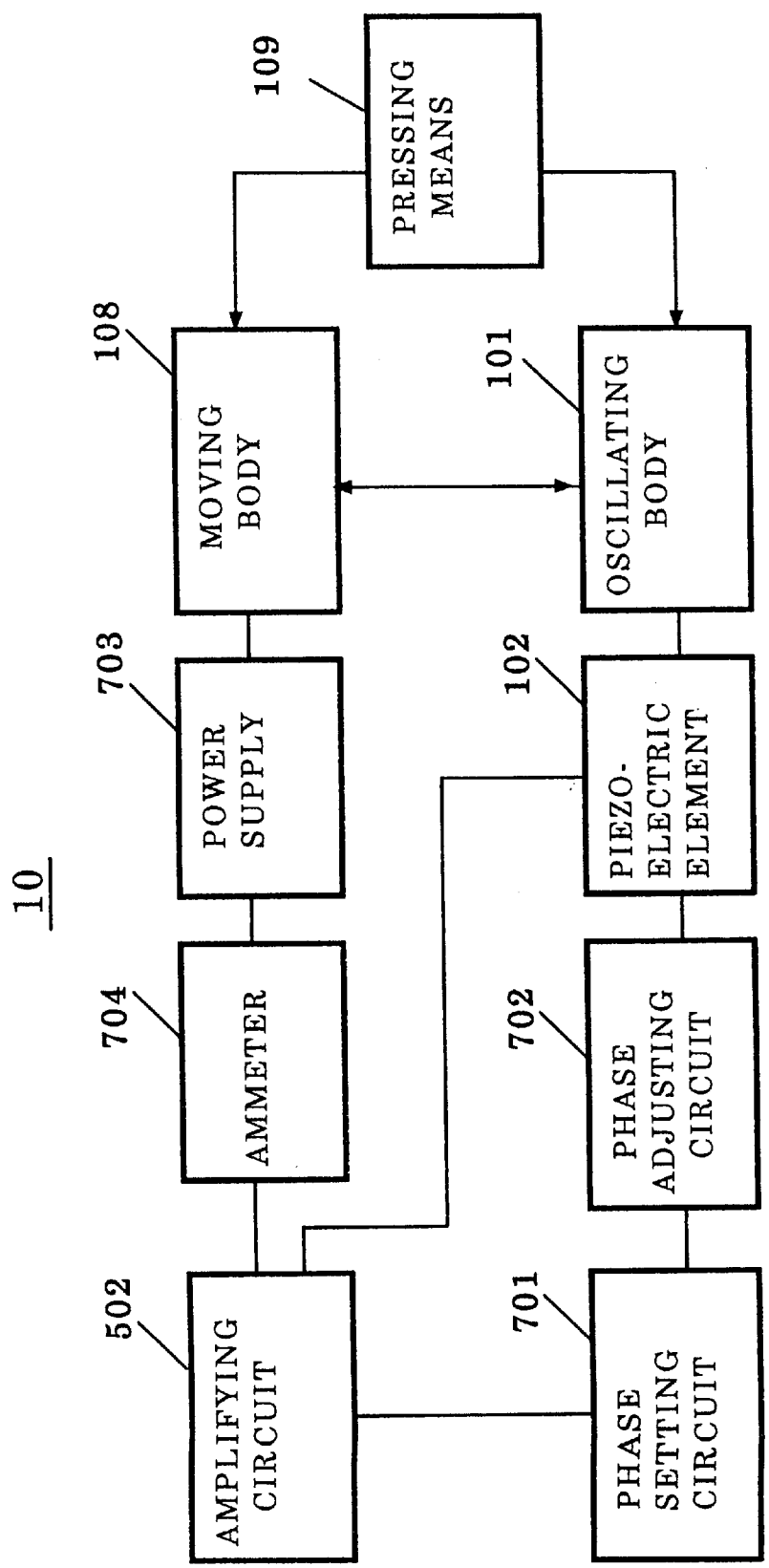
FIG. 1 is a block diagram showing an ultrasonic wave motor device 10 that is a first embodiment of an ultrasonic wave motor device according to the present invention.

According to the present invention, there is provided an ultrasonic wave motor device in which an oscillating body comprising at least a piezo-electric element is connected at least to an amplifying circuit and a phase setting circuit, a driving circuit for oscillating the oscillating body in a self-excited oscillation by a predetermined resonance mode is constituted and a moving body is frictionally driven by an oscillation wave caused in the oscillating body, the device including characteristic measuring means for measuring a characteristic of the ultrasonic wave motor driving circuit or a characteristic of the ultrasonic wave motor device, and a phase adjusting unit for correcting a shift of a phase set by the phase setting circuit based on a result of analyzing a measured value by the characteristic measuring means.

According to the present invention, information for determining error in the characteristic of the ultrasonic wave motor device is provided by measuring the characteristic of the ultrasonic wave motor driving circuit or the ultrasonic wave motor device by the characteristic measuring means and when the error of the characteristic is adjusted by the phase adjusting unit based on the information, the phase of the ultrasonic wave motor driving circuit is finely adjusted and the characteristic of the ultrasonic wave motor device is corrected. This is based on the fact that although the characteristic of the ultrasonic wave motor is significantly changed by the frequency for driving the motor, the oscillation frequency is changed by a set phase in a self-excited oscillation circuit and a value of voltage applied on the piezo-electric element is also changed by changing a constant of a filter constituting the phase adjusting unit in the case of utilizing a Colpitts type oscillation circuit or the like.

Accordingly, a shift of phase from a theoretical value in the ultrasonic wave motor driving circuit constituted by elements having values which are theoretically calculated in view of circuit design, can be corrected and the characteristic of the ultrasonic wave motor is constituted to be adjustable and accordingly, the characteristic of the ultrasonic wave motor device can be promoted and further, a dispersion in the individual devices can be reduced.

According to the present invention, there is provided the ultrasonic wave motor device further including a boosting circuit for driving to excite an electrode pattern formed at the piezo-electric element by boosting an output voltage of the amplifying circuit, and a stop signal generating circuit for selecting from outside execution and stoppage of an amplifying function of the amplifying circuit.

According to the present invention, by providing the boosting circuit, stable operation can be carried out by a power supply having low power, and by providing the stop signal generating circuit, operation and stoppage of the ultrasonic wave motor device can simply be controlled.

Accordingly, in the ultrasonic wave motor device capable of being driven by the power supply having low power and simply carrying out operation control, a shift of the phase from a theoretical value can be corrected and accordingly, the characteristic of the ultrasonic wave motor device can be promoted and the dispersion of individual devices can be reduced.

EXAMPLES

A detailed explanation will be given of embodiments of an electronic apparatus having an ultrasonic wave motor device according to the present invention in reference to FIG. 1 through Fig, 8 as follows.
(First Embodiment)

A detailed explanation will be given of a first embodiment of an ultrasonic wave motor device according to the present invention in reference to FIG. 1 through FIG. 5 as follows.

FIG. 1 is a block diagram showing an ultrasonic wave motor device 10 constituting the first embodiment of the ultrasonic wave motor device according to the present invention.

Figure 2:
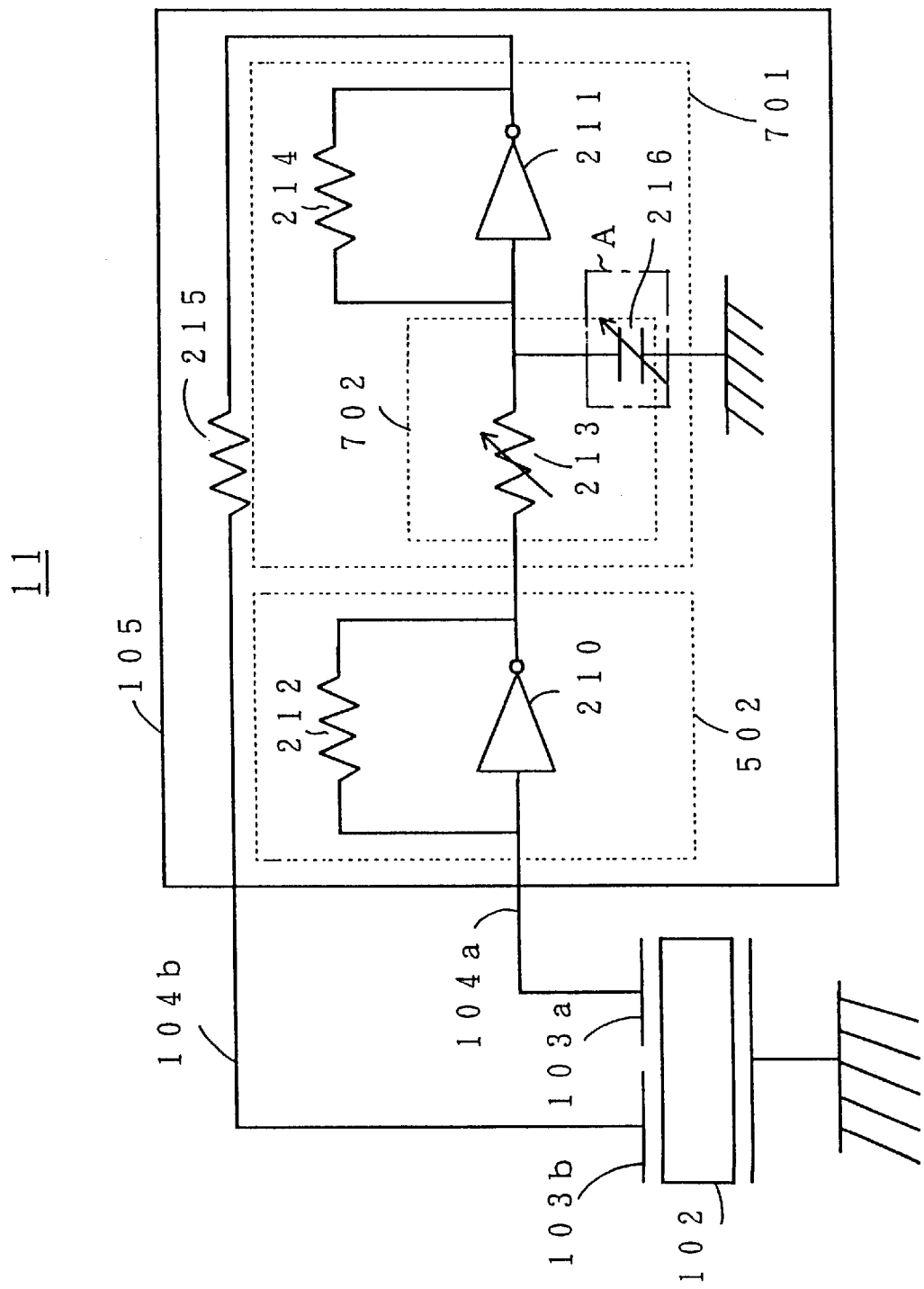
FIG. 2 is a circuit diagram showing an ultrasonic wave motor driving circuit 11 for driving the ultrasonic wave motor device 10.

FIG. 2 is a circuit diagram showing an ultrasonic wave motor driving circuit 11 for driving the ultrasonic wave motor device 10.

First, an explanation will be given of the constitution in reference to FIG. 1 and FIG. 2.

In FIG. 1, the ultrasonic wave motor device 10 is constituted by an oscillating body 101, a piezo-electric element 102, a moving body 108, pressing means 109, an amplifying circuit 502, a phase setting circuit 701, a phase adjusting circuit 702, a power supply 703 and an ammeter 704.

In FIG. 1 and FIG. 2, one face of the oscillating body 101 is coupled with one face of the piezo-electric element 102 and is oscillated by oscillation of the piezo-electric element 102 which is driven to excite by the driving circuit. The other face of the oscillating body 101 transmits the oscillation to the moving body 108 in contact therewith.

One face of the moving body 108 is pressed by the pressing means 109 to be brought into contact with the oscillating body 101 under constant pressure, and the moving body is moved to rotate by receiving the oscillation of the oscillating body 101.

The pressing means 109 is arranged to bring the moving body 108 into contact with the oscillating body 101 under constant pressure and assists to cause pertinent frictional force between the moving body 108 and the oscillating body 101 to carry out stable rotational movement.

The face of the piezo-electric element 102 which is not coupled with the face of the oscillating body 101 is provided with electrode patterns 103a and 103b. The piezo-electric element 102 constitutes, the driving circuit as one element in the driving circuit, is oscillated in self-excited oscillation by an exciting signal with the natural frequency generated in the driving circuit as a major component and transmits the oscillation caused by the self-excited oscillation to the oscillating body 101.

The electrode pattern 103a is formed on the face of the piezo-electric element 102 opposed to the face coupled with the oscillating body 101, detects the exciting signal of the piezo-electric element 102 and transmits the exciting signal to the amplifying circuit 502 via a wiring 104a.

The amplifying circuit 502 is constituted by parallel connection of an inverter 210 and a resistor 212, an input terminal thereof is connected to the electrode pattern 103a, an output terminal thereof is connected to the phase setting circuit 701, a power supply input terminal is connected to the ammeter 704 and the exciting signal detected by the electrode pattern 103a is transmitted to the phase setting circuit 701 after reverted amplification.

The phase setting circuit 701 is constituted as a kind of a low pass filter for restraining higher modes by an integrating circuit comprising a resistor 213 and a condenser 216, and a reverted amplifying circuit comprising a parallel connection of an inverter 211 and a resistor 214. The phase setting circuit 701 sets the phase of the exciting signal amplified by the amplifying circuit 502 by using elements (resistor 213, resistor 214, condenser 216, inverters 210, 211) having values calculated by circuit design.

In FIG. 2, the phase adjusting circuit 702 shares the elements commonly with the phase setting circuit 701, constituted by the variable resistor 213 and the variable condenser 216 for further finely adjusting the phase of the exciting signal set by the phase setting circuit 701 based on analysis on the current consumption value of the ultrasonic wave motor device by the ammeter 704 and the measured value of the characteristic of the amplifying circuit 502.

A resistor 215 smoothes the exciting signal.

An oscillation driving circuit 105 is constituted by the amplifying circuit 502, the phase setting circuit 701 and the resistor 215 for carrying out phase setting, amplifying and smoothing operation.

The electrode pattern 103b is formed on the face of the piezo-electric element 102 opposed to the face coupled with the oscillating body 101 and outputs the exciting signal generated by the oscillation driving circuit 105 to the piezo-electric element 102.

Although not illustrated with FIG. 2, one terminal of the ammeter 704 is connected to the power supply 703, not illustrated in FIG. 2, and the other terminal of the ammeter 704 is connected to the power supply input terminal of the inverter 210 for measuring electric characteristic (current amplifying rate in transistor or the like) of the amplifying circuit 502 and providing information necessary for phase adjustment in the phase adjusting circuit 702.

Next, an explanation will be given of the operation in reference to FIG. 2.

In FIG. 2, when the power supply 703, not illustrated, is brought into an ON state, a signal outputted by the inverter 210 constitutes a square wave signal the phase of which is set by the phase setting circuit 701. The square wave signal is smoothed by the resistor 215 and is outputted to the piezo-electric element 102 as the exciting signal by the electrode pattern 103b via the wiring 104b. The exciting signal inputted to the piezo-electric element 102 oscillates the piezo-electric element 102 and the vibration information of the piezo-electric element 102 is detected by the electrode pattern 103a and is inputted to the amplifying circuit 502 via the wiring 104a.

The input of the amplifying circuit 502, that is, the input signal of the inverter 210 is revertedly amplified by the inverter 210 and is outputted to the phase setting circuit 701 by which the exciting signal is fed back and the exciting signal with the natural frequency as the major component is caused permanently in the ultrasonic wave motor driving circuit 11 when the power supply 703 is in an ON state.

In this case, the values of the respective elements constituting the ultrasonic wave motor driving circuit 11: are calculated theoretically in view of circuit design and accordingly, the exciting signal caused in the ultrasonic wave motor driving circuit 11 should have the frequency and the amplitude of oscillation as expected. However, in the actual fabrication steps, the driving circuit includes error of characteristic of each element constituting the circuit, the characteristic of the piezo-electric element, dimensions of the oscillating body and so on and the oscillation wave having the frequency or the amplitude is not always caused as expected.

Hence, the electric characteristic of the amplifying circuit, for example, the electric characteristics of the inverter 210 and 211 (high level output current, or low level output current, or a ratio of both) in FIG. 2, are calculated by a measurement system using an ammeter and a power supply, not illustrated, and information for analyzing the actual operational state of the driving circuit is provided. When correction is determined to be necessary in accordance with the information, the shift of the phase is corrected by finely adjusting the value of the variable resistor 213 or the variable condenser 216 constituting the phase adjusting circuit 702.

The reason for constituting the phase adjusting circuit 702 by making variable the resistor 213 and the condenser 216 which are elements constituting the phase setting circuit 701 in the ultrasonic wave motor driving circuit 11, resides in that the integrating circuit constituted by the resistor 213 and the condenser 216 relates to adjustment of the phase by its time constant (a product of the value of the resistor 213 by the value of the condenser 216).

Considering the fact, both elements of the resistor 213 and the condenser 216 need not to be variable necessarily for constituting the phase adjusting circuit 702 and at least one of the resistor 213 and the condenser 216 may be variable.

At least one of the resistor 213 and the condenser 216 may be a circuit having a new constitution and although constitutions enabling as the phase adjusting circuit 702 are innumerable, only two examples are pointed out as follows as examples therefor.

Figure 3B:
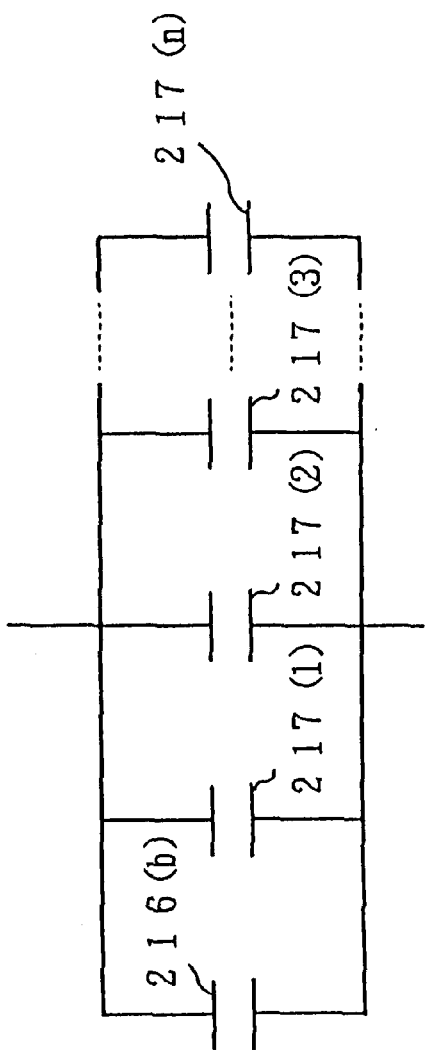
FIGS. 3A and 3B are circuit diagrams showing examples of a condenser circuit for adjusting a phase substituting portion A of FIG. 2.
Figure 3A:
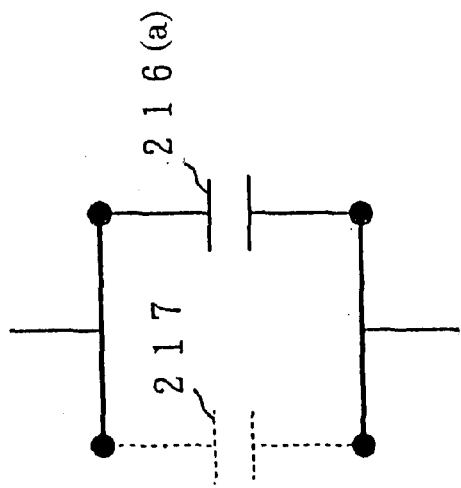

For example, the phase adjusting circuit 702 may have a constitution in which a circuit where a fixing condenser 216(a) and an adjusting condenser 217 are connected in parallel as shown by FIG. 3(a), is inserted into portion A in FIG. 2 as a substitute for the condenser 216 in FIG. 2. According to the constitution where the constitution of FIG. 3(a) is inserted into portion A in FIG. 2, rough phase setting is carried out by the fixing condenser 216(a) of a theoretically calculated value and when fine adjustment is needed, the adjusting condenser 217 having a pertinent electrostatic capacitance is arranged to insert by which the adjustment can be carried out.

Similarly, there may be a constitution in which a circuit where fixing condensers having different capacitances (a fixing condenser 216(b) and a plurality of adjusting condensers 217(1), 217(2), . . . , 217(n)) are connected in parallel as shown by FIG. 3(b), is inserted into portion A in FIG. 2 as a substitute for the condenser 216 in FIG. 2. According to the circuit shown in FIG. 3(b) rough phase setting is carried out by the fixing condenser 216(b) having a theoretically calculated value and when fine adjustment is needed, a pattern on a substrate where the plurality of adjusting condensers (condensers 217(1), 217(2), . . . , 217(n)) are mounted is selectively cut to constitute a condenser capacitance having a necessary amount by which automation of adjusting operation by machine is facilitated and simplified adjustment is feasible.

Further, in respect of a method of measuring the characteristic of the ultrasonic wave motor driving circuit 11, it is not limited to the above-described method of measuring the characteristic of the amplifying circuit 502 by using the ammeter 704 but a method suitable for the situation can be selected among various measuring methods.

An explanation will be given of a difference from the method of FIG. 1 in respect of two examples as methods for measuring the characteristic of the ultrasonic wave motor driving circuit 11 with reference to FIG. 4 and FIG.,5 as follows.

Figure 4:
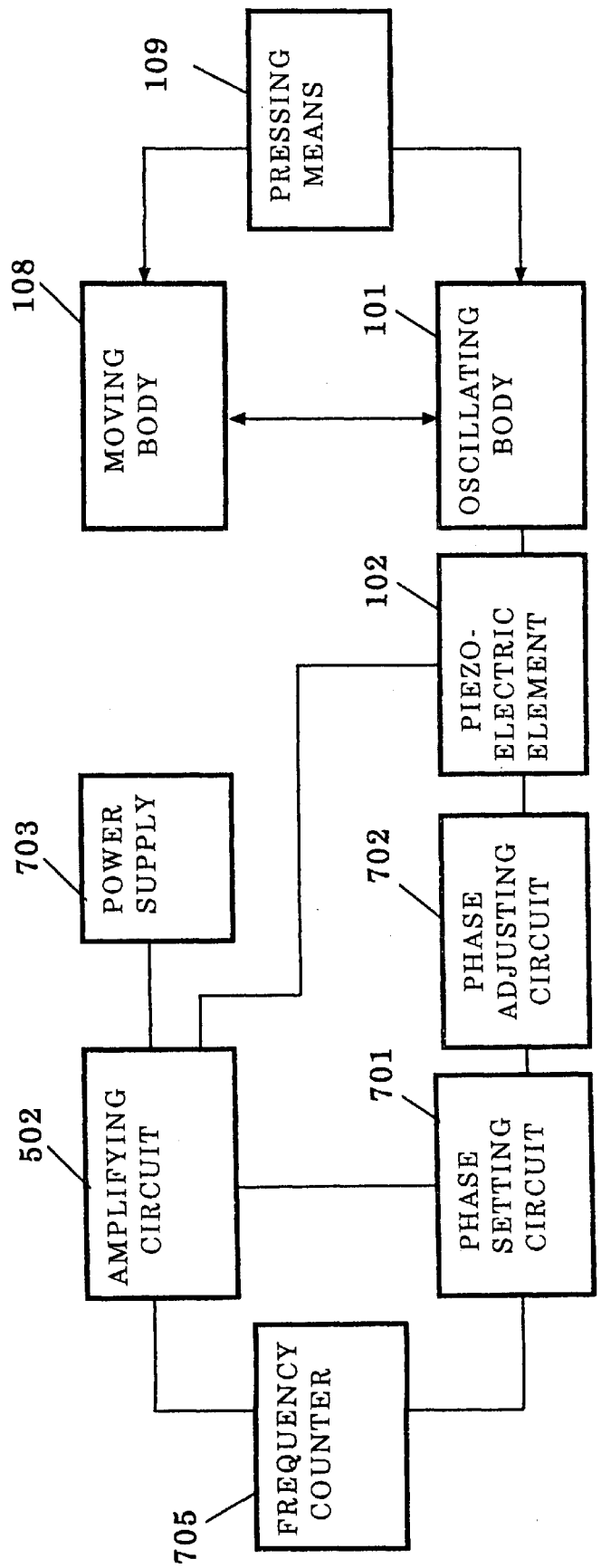
FIG. 4 is a block diagram showing the case where characteristic measuring means is a frequency counter in the first embodiment where an ultrasonic wave motor device of the present invention is applied.
Figure 5:
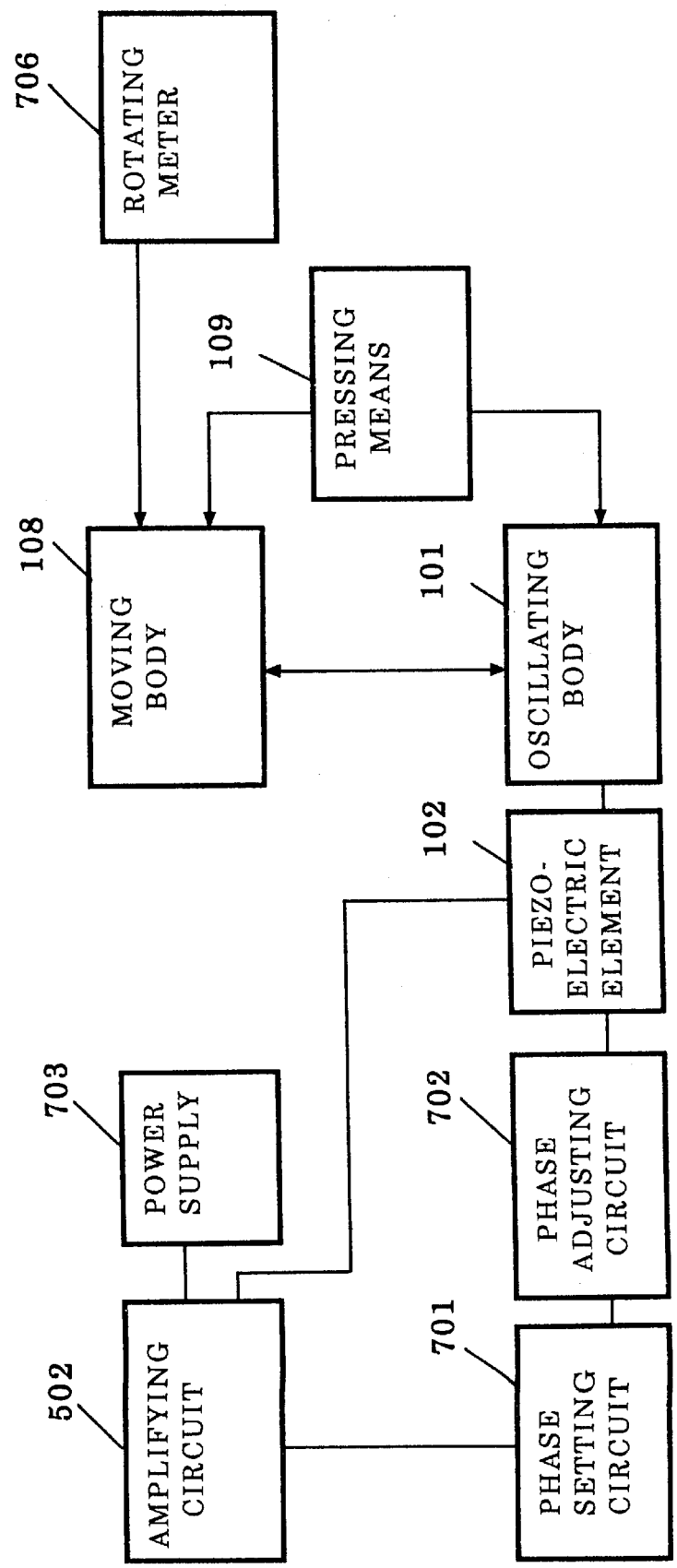
FIG. 5 is a block diagram showing the case where the characteristic measuring means is a rotating meter in the first embodiment where the ultrasonic wave motor device of the present invention is applied.

FIG. 4 and FIG. 5 are block diagrams showing samples of using measuring methods different from that shown in FIG. 1 in the first embodiment of the ultrasonic wave motor device according to the present invention.

FIG. 4 shows a constitution in which in FIG. 1, the ammeter 704 that is the characteristic measuring means of the driving circuit is removed and a frequency counter 705 is arranged between the amplifying circuit 502 and the phase setting circuit 701 as a substitute means. In comparison with the characteristic measuring method of the amplifying circuit, the characteristic measuring method using the frequency counter 705 is a further direct measuring means in view of measuring whether a frequency expected is obtained. Furthermore, since the drive frequency has a close relationship with the current consumption as well as the oscillation amplitude of the ultrasonic wave motor, obtained information for correction is more reliable and the correction can be carried out effectively.

FIG. 5 shows a constitution where in FIG. 1, the ammeter 704 that is the characteristic measuring means of the driving circuit is removed and a revolution indicator or rotating member 706 for measuring the number of rotations of the moving body 108 is arranged. In comparison with the characteristic measuring method using the ammeter 704 and the characteristic measuring method using the frequency counter 705, the characteristic measuring method using the revolution indicator 706 is a further direct measuring means in view of measuring whether the ultrasonic wave motor device 10 is operated at a rotational number expected. Accordingly, information for correction obtained by a measured value is more reliable and the correction can also be carried out effectively. Incidentally, the correction may be carried out not only by the rotational number of the ultrasonic wave motor device 10 but a torque, an operational voltage range, current consumption, the driving frequency or the like.

However, in proportion to enhancement of the reliability of the characteristic measuring method, the complexity of the characteristic measuring method in fabrication steps is also increased and therefore, what characteristic measuring method is to be selected needs to be determined pertinently depending on the situation.

For example, in the case where the characteristic is measured by using the ammeter 704 (FIG. 1) or the case where the characteristic is measured by using the frequency counter 705 (FIG. 4), the measuring method is not dependent on the structure. Furthermore, in the case of a method of measuring the characteristic of a circuit, during fabrication steps, before attaching structural members such as the moving body 108 which is a rotating unit of the ultrasonic wave motor and the pressing means 109 for bringing the moving body 108 into press contact with the oscillating body 101, an elastic body constituting a load in the driving circuit such as the oscillating body 101 coupled with the piezo-electric element (102) or only the piezo-electric element (102) or the like can be used as a member substituting for the rotating unit. In this case, the reliable characteristic of the circuit can be measured efficiently over a long period of time by preparing a stator constituting a reference without being mindful of a change in the characteristic caused by wear of the moving body.

Further, naturally, as mentioned above, when the characteristic of a circuit element, for example, the characteristic of the amplifying circuit is measured, the characteristic of a single body of the circuit element may be measured without attaching a load and carry out adjustment of phase, capacitance value, resistance value or the like in later steps.

According to such a method, the phase adjustment can be carried out before attaching structural members and adjusting operation in fabrication steps is facilitated.

By the phase adjusting method selected from the plurality of phase adjusting circuits and characteristic measuring methods described above, by the exciting signal adjusted to the frequency or the amplitude expected, the piezo-electric element 102 oscillates the oscillating body 101 coupled to the one face of the piezo-electric element 102 with expected specific frequency or amplitude. The oscillating body 101 which is oscillated by receiving the oscillation of the piezo-electric element 102, rotates the moving member 108 arranged to be brought into contact with the oscillating body 101 under constant pressure by the pressing means 109 by transmitting the oscillation of its own.

As has been explained, according to the constitution of the embodiment, the phase of the exciting signal of the driving circuit the phase of which is roughly set by the element having the theoretically calculated value, is measured by some characteristic measuring method and the phase can be finely adjusted based on the information obtained by the measurement. Therefore, a difference in characteristics of respective products can simply be corrected and the characteristic of the ultrasonic wave motor device can be promoted.

(Second Embodiment)

A detailed explanation will be given of a second embodiment of an ultrasonic wave motor device according to the present invention in reference to FIG. 6 and FIG. 7 as follows.

Figure 6:
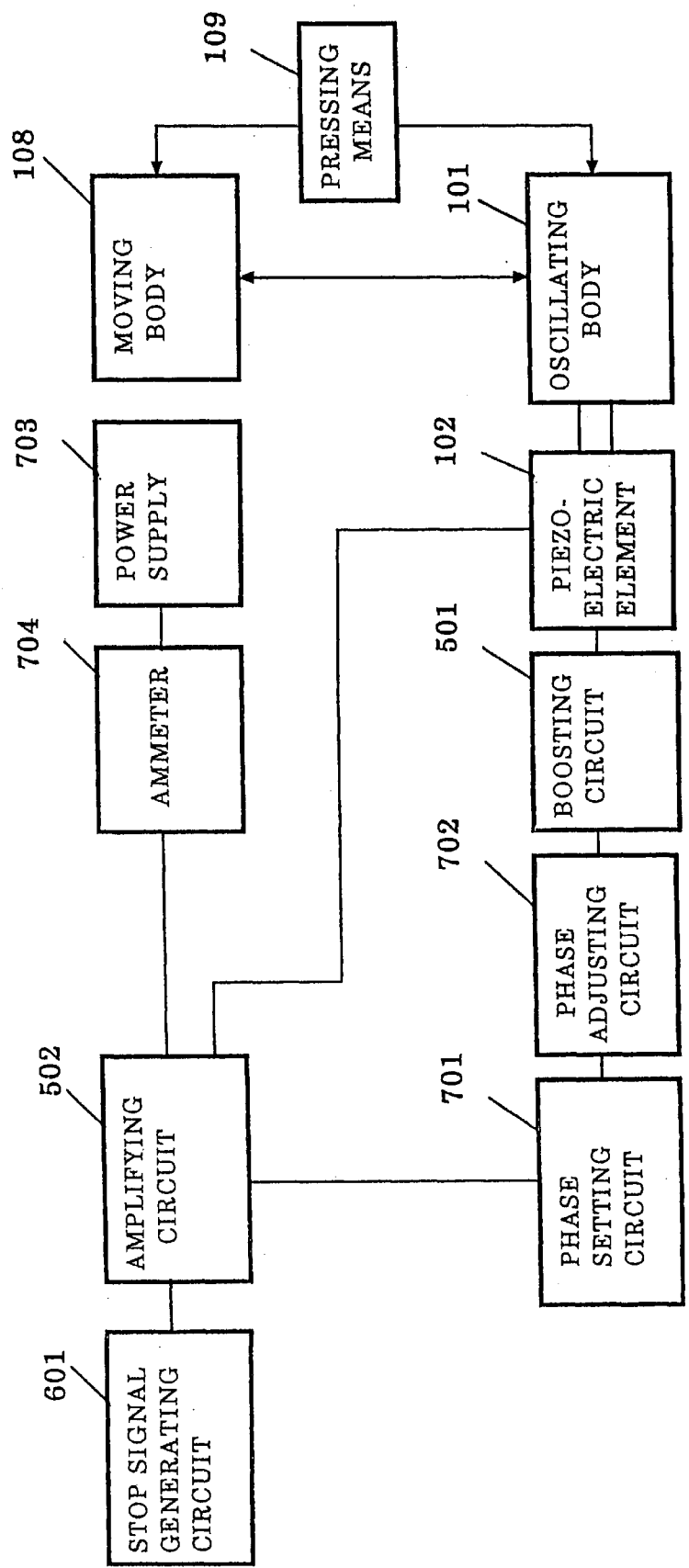
FIG. 6 is a block diagram showing an ultrasonic wave motor device 20 that is a second embodiment of the ultrasonic wave motor device according to the present invention.

FIG. 6 is a block diagram showing an ultrasonic wave motor device 20 which is the second embodiment of the ultrasonic wave motor device according to the present invention.

Figure 7:
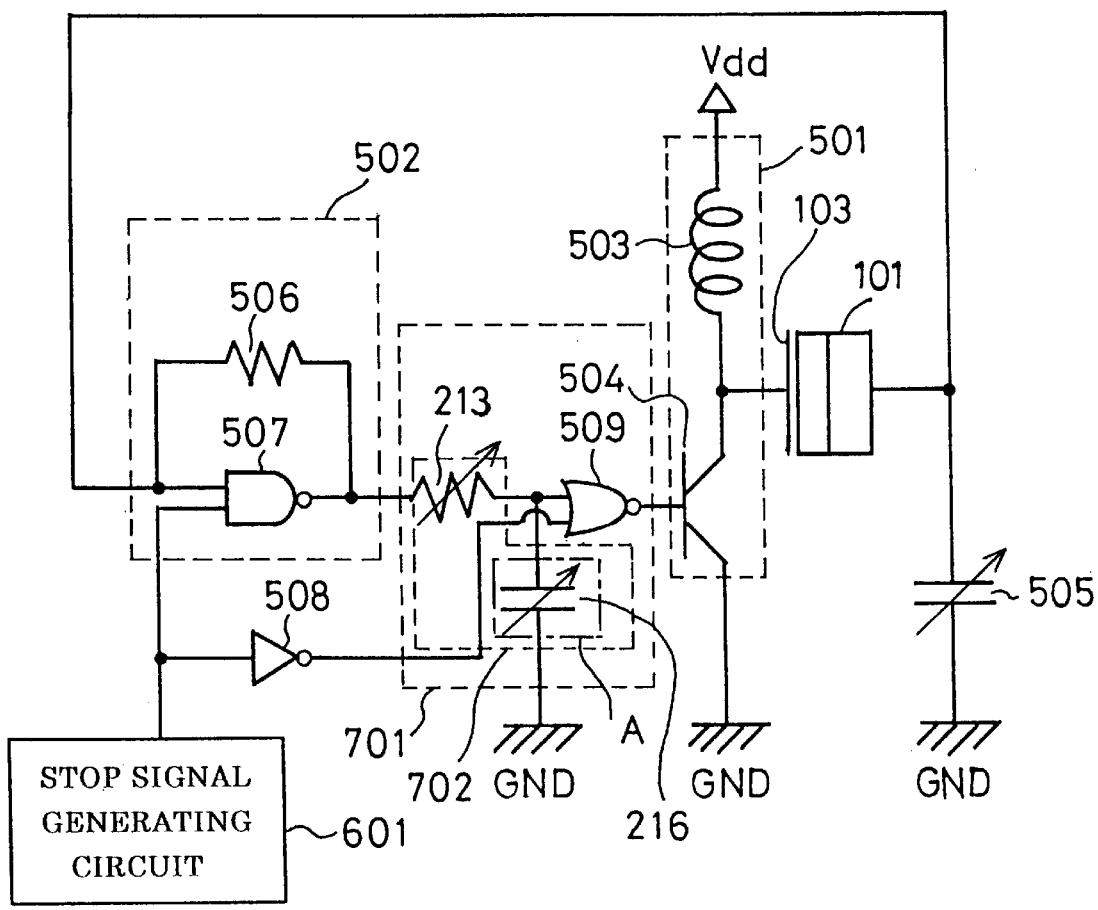
FIG. 7 is a circuit diagram showing an ultrasonic wave motor driving circuit 21 for driving an ultrasonic wave motor device 20.

FIG. 7 is a circuit diagram showing an ultrasonic wave motor driving circuit 21 for driving the ultrasonic wave motor device 20 and which has an oscillating circuit of a Colpitts type and is provided a boosting circuit.

First, an explanation will be given of the constitution in reference to FIG. 6 and FIG. 7.

In FIG. 6, the ultrasonic wave motor device 20 is constituted by an oscillating body 101, a piezo-electric element 102, a moving body 108, pressing means 109, a boosting circuit 501, an amplifying circuit 502, a stop signal generating circuit 601, a phase setting circuit 701, a phase adjusting circuit 702, a power supply 703 and an ammeter 704.

An explanation will be given of only a difference from FIG. 1 and FIG. 2 which are referred in the first embodiment as follows.

In FIG. 6 and FIG. 7, one face of the oscillating body 101 is coupled with one face of the piezo-electric element 102. The oscillating body 101 is oscillated by oscillation of the piezo-electric element 102 driven to excite by a driving circuit and transmits the oscillation to the moving body 108 which is brought into contact therewith at the other face of the oscillating body. Further, the oscillating body 101 also serves as electrodes, detects oscillation information of the piezo-electric element 102 and outputs it to the amplifying circuit 502.

The one face of the piezo-electric element 102 is coupled with the one face of the oscillating body 101, and other face thereof is provided with an electrode pattern. The piezo-electric element 102 constitutes the driving circuit as one element in the driving circuit, is oscillated in self-excited oscillation by an oscillating signal with the natural frequency caused in the driving circuit as a major component and transmits the oscillation caused by the self-excited oscillation to the oscillating body 101.

The amplifying circuit 502 is constituted by connecting in parallel an NAND gate 507 and a resistor 506. One input terminal of the NAND gate 507 is connected to the oscillating body 101, another input terminal is connected to a stop signal generating circuit 601, and an output terminal is connected to the phase setting circuit 701. Furthermore, a power supply input terminal is connected to the ammeter 704 and an exciting signal detected by the oscillating body 101 is revertedly amplified and transmitted to the phase setting circuit 701.

Although the stop signal generating circuit 601 outputs an operating signal (High signal) in the normal operational state of the driving circuit, the stop signal generating circuit 601 stops the exciting signal generated at the driving circuit by outputting a stop signal (Low signal) to the NAND gate 507 and an NOR gate 509 (signal outputted to the NOR gate 509 is reverted by the inverter 508).

The phase setting circuit 701 is constituted by an integrating circuit comprising the resistor 213 and the condenser 216 and a revertedly amplifying circuit comprising the NOR gate 509 and sets the phase of the exciting signal amplified by the amplifying circuit 502 by using elements (resistor 213, condenser 216) having values: calculated by a calculation in view of circuit design.

The phase adjusting circuit 702 shares elements with the phase setting circuit 701 in FIG. 7, is constituted by the variable resistor 213 and the variable condenser 216 and adjusts further finely the phase of the exciting signal set by the phase setting circuit 701 based on a measured value of the characteristic of the amplifying circuit 502 by the ammeter 704. Further, a similar effect is achieved also by making variable a condenser 505.

The boosting circuit 501, which is constituted by a booster coil 503 and an NPN transistor 504, boosts the exciting signal and outputs it to the electrode pattern 103.

The electrode pattern 103 is formed on a face of the piezo-electric element 102 opposed to the face coupled with the oscillating body 101 and outputs the exciting signal generated by an oscillation driving circuit to the piezo-electric element 102.

Next, an explanation will be given of the operation which reference to FIG. 7.

In FIG. 7, when the power supply 703, not illustrated, is brought into an ON state and the operating signal (High signal) is outputted from the stop signal generating circuit

601, the NAND gate 507 outputs the High signal since the Low signal is inputted to the input terminal of the NAND gate 507 connected to the oscillating body 101 of the NAND gate. The High signal outputted from the NAND gate 507 constitutes a square wave signal the phase of which is set by the phase setting:circuit 701. The square wave signal is boosted by the boosting circuit 501 and at the same time smoothed and outputted to the piezo-electric element 102 as the exciting signal by the electrode pattern 103. The exciting signal inputted to the piezo-electric element 102 oscillates the piezo-electric element 102 and the oscillation information of the piezo-electric element 102 is detected by the oscillating body 101 and is inputted to the amplifying circuit 502.

When the High signal is outputted from the stop [si]gnal generating circuit 601, the NAND gate 507 operates as an inverter for revertedly amplifying the signal from the oscillating body 101 and accordingly, the input of the amplifying circuit 502, that is, the input signal from the oscillating body 101 of the NAND gate 507 is revertedly amplified and outputted to the phase setting circuit 701 by the NAND gate 501 by which the exciting signal is fed back. When the power supply is ON and the operating signal (High signal) is outputted from the stop signal generating circuit 601, the exciting signal with the natural frequency as the major component is permanently generated in the ultrasonic wave motor driving circuit 21.

However, when the stop signal (Low signal) is outputted from the stop signal generating circuit 601, the NAND gate 507 stationarily outputs the High signal by inputting the Low signal from the stop signal generating circuit 601 and the High signal is inputted to one input terminal of the NOR gate 509. The stop signal (Low signal) from the stop signal generating circuit 601 is reverted by an inverter 508 and is inputted to other input terminal of the NOR gate 509 as the High signal. In accordance with two of the High signal inputs, the NOR gate 509 stationarily outputs the Low signal. When the output of the NOR gate 509 is the Low signal, an NPN transistor 504 is brought into an OFF state and the exciting signal of the driving circuit is stopped.

In this case, the values of the respective elements constituting the ultrasonic wave motor driving circuit 21 are theoretically calculated in view of circuit design and, therefore, the exciting signal generated at the ultrasonic wave motor driving circuit 11 should be provided with a frequency as expected. However, in the actual fabrication steps, the driving circuit includes error in the characteristics of the respective elements constituting the circuit, error caused by environmental conditions of use and so on. Accordingly, an oscillation wave having the frequency and the amplitude as expected is not always generated necessarily.

Hence, the ammeter 704, not illustrated in FIG. 2, measures the electric characteristic of the NAND gate 507 in flowing stationary current and provides information for analyzing the actual operational state of the driving circuit, When correction is determined to be necessary by the information, the shift of the phase is corrected by finely adjusting a value of the variable resistor 213 or the variable condenser 216 or the variable condenser 505 constituting the phase adjusting circuit 702.

Further, with regard to the characteristic measuring method and the phase adjusting method of the driving circuit, the content described in reference to FIG. 3 through FIG. 5 in the description of the first embodiment is effective also in the second embodiment. Particularly, in measuring the driving circuit, it is effective to adjust the phase by the characteristic (above all IOH/IOL described before) of the amplifying circuit immediately before the boosting circuit 501. As has been explained, according to the embodiment, by providing the boosting circuit, stable operation can be carried out by the power supply having low power. Furthermore, according to the ultrasonic wave motor device where operation and stoppage can be controlled simply by providing the stop signal generating circuit, the phase of the exciting signal of the ultrasonic wave motor driving circuit the phase of which is roughly set by the elements having theoretically calculated values, is measured by some characteristic measuring method, fine adjustment of the phase can be carried out based on information obtained by the measurement and accordingly, a difference in the characteristics among respective products can simply be corrected, the characteristic of the ultrasonic wave motor device can be promoted and the dispersion can be reduced.

Figure 8:
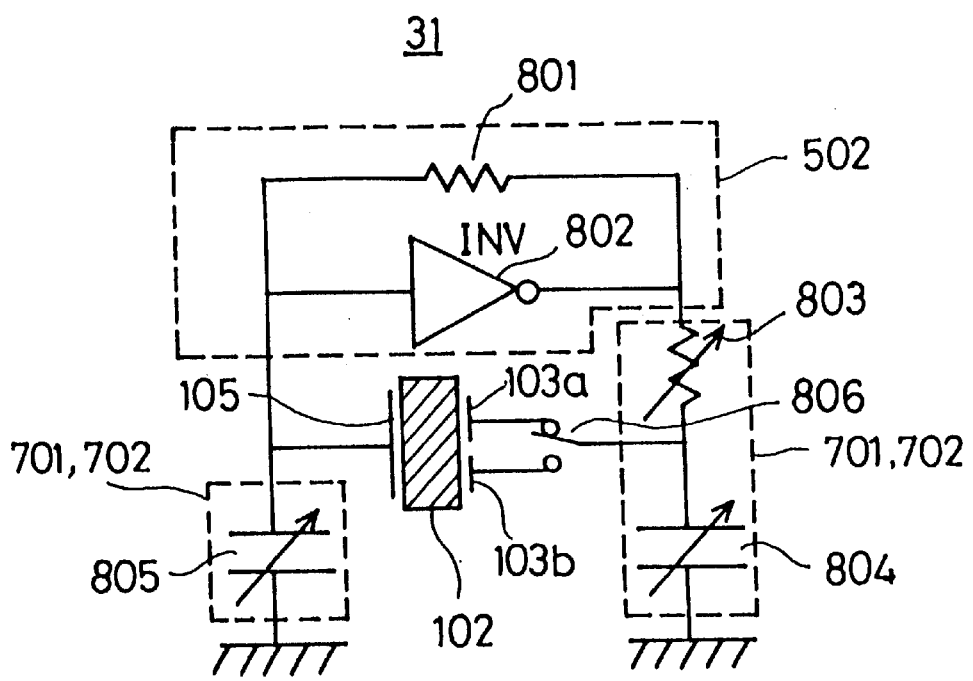
FIG. 8 is a circuit diagram showing an ultrasonic wave motor driving circuit 31 using an oscillating circuit of a Colpitts type according to the embodiment.

Naturally, as shown by FIG. 8, even in the case where a normal Colpitts type oscillating circuit having no boosting circuit is used, the difference in the characteristics among the respective products can simply be corrected and the characteristic of the ultrasonic wave motor device can be promoted by measuring the characteristic of the driving circuit or the ultrasonic wave motor device and finely adjusting the phase by adjusting the resistor 803, or the variable condenser 804 or the variable condenser 805 based on information obtained by the measurement.

(Third Embodiment)

FIG. 9 shows a block diagram of a third embodiment of an electronic apparatus having an ultrasonic wave motor according to the present invention. An electronic apparatus having an ultrasonic wave motor device can be realized by a constitution where a transmitting mechanism (801) integrally operated with the moving body (108) of the ultrasonic wave motor by using the ultrasonic wave motor shown by the previous embodiments and an output mechanism 802 operated based on the operation of the transmitting mechanism (801), are installed.

The transmitting mechanism (801) preferably uses gears or a transmitting wheel or the like of a fractional wheel or the like. The output mechanism (802) preferably uses a shutter driving mechanism, a diaphragm driving mechanism, a lens driving mechanism and the like in a camera, an electronic clock, a tool feeding mechanism or a work member feeding mechanism or the like.

As electronic apparatuses having an ultrasonic wave motor device according to the present invention, preferably, an electronic clock, a measuring instrument, a camera, a printer, a printing machine, a machine tool, a robot, a moving device and the like can be realized. Further, the driving device of the ultrasonic wave motor can be realized by a constitution where an output shaft is attached to the moving body and a power transmitting mechanism for transmitting torque on the output shaft is installed.

What is claimed is:

1. An ultrasonic wave motor device comprising: an oscillating body having a piezo-electric element; a driving circuit for applying an exciting signal to the piezo-electric element to oscillate the oscillating body in self-excited oscillation, the driving circuit having an amplifying circuit for amplifying the exciting signal and a phase setting circuit for setting a phase of the exciting signal amplified by the amplifying circuit; measuring means for measuring a characteristic of the driving circuit or a characteristic of the oscillating body; and a phase adjusting circuit for correcting a shift of the phase of the exciting signal in accordance with a measurement by the measuring means.

2. An ultrasonic wave motor device as claimed in claim 1; wherein the characteristic measured by the measuring means comprises an electric characteristic of the driving circuit.

3. An ultrasonic wave motor device as claimed in claim 2: wherein the measured electric characteristic of the driving circuit comprises a voltage amplifying degree of the amplifying circuit.

4. An ultrasonic wave motor device as claimed in claim 2; wherein the measured electric characteristic of the driving circuit comprises a current amplifying degree of the amplifying circuit.

5. An ultrasonic wave motor device as claimed in claim 2; wherein the measured electric characteristic of the driving circuit comprises a high level output current of the amplifying circuit.

6. An ultrasonic wave motor device as claimed in claim 2; wherein the measured electric characteristic of the driving circuit comprises a low level output current of the amplifying circuit.

7. An ultrasonic wave motor device as claimed in claim 2; wherein the measured electric characteristic of the driving circuit comprises a high level output current (IOH) of the amplifying circuit or a low level output current (IOL) of the amplifying circuit; and wherein the phase adjusting circuit adjusts a shift of the phase of the excited signal in accordance with a value of the ratio IOH/IOL of the amplifying circuit.

8. An ultrasonic wave motor device as claimed in claim 2; wherein the oscillating body has a stator unit; and wherein the measured electric characteristic of the driving circuit comprises a current consumption value or an oscillation frequency of the stator unit.

9. An ultrasonic wave motor device as claimed in claim 1; wherein the characteristic measured by the measuring means comprises a high level output current (IOH) of the amplifying circuit or a low level output current (IOL) of the amplifying circuit; and wherein the phase adjusting circuit adjusts a shift of the phase of the exciting signal in accordance with a value of the ratio IOH/IOL of the amplifying circuit.

10. An ultrasonic wave motor device as claimed in claim 1; wherein the characteristic measured by the measuring means comprises an electric characteristic of the oscillating body.

11. An ultrasonic wave motor device as claimed in claim 10; wherein the oscillating body has a moving body movably disposed thereon for rotation in response to oscillation of the oscillating body; and wherein the measured electric characteristic of the oscillating body comprises a rotational number value of the moving body.

12. An ultrasonic wave motor device as claimed in claim 10; wherein the oscillating body has a moving body movably disposed thereon for rotation in response to oscillation of the oscillating body; and wherein the measured electric characteristic of the oscillating body comprises a torque of the moving body.

13. An ultrasonic wave motor device as claimed in claim 10; wherein the measured electric characteristic of the oscillating body comprises a current consumption value of the oscillating body.

14. An ultrasonic wave motor device as claimed in claim 10; wherein the measured electric characteristic of the oscillating body comprises an oscillation frequency of the oscillating body.

15. An ultrasonic wave motor device as claimed in claim 10; wherein the measured electric characteristic of the oscillating body comprises a drive voltage range of the oscillating body.

16. An ultrasonic wave motor device as claimed in claim 1; wherein the phase adjusting circuit comprises a filter circuit having a resistor and a condenser.

17. An ultrasonic wave motor device as claimed in claim 16; wherein at least one of the resistor and the condenser comprises a variable element.

18. An ultrasonic wave motor device as claimed in claim 1; wherein the phase adjusting circuit comprises a filter circuit having a resistor and a plurality of condensers connected in parallel.

19. An ultrasonic wave motor device as claimed in claim 1; wherein the phase adjusting circuit has a plurality of condensers connected in parallel.

20. An ultrasonic wave motor device comprising: a piezo-electric element having an electrode pattern; an oscillating body connected to the piezo-electric element to be vibrationally driven thereby; a driving circuit for driving the oscillating body in self-excited oscillation in a predetermined resonance mode by an exciting signal, the driving circuit having an amplifying circuit for amplifying the exciting signal and a phase setting circuit for setting a phase of the exciting signal amplified by the amplifying circuit; a boosting circuit for boosting an output voltage of the amplifying circuit and applying the boosted output voltage to the electrode pattern of the piezo-electric element to vibrationally drive the oscillating body; measuring means for measuring a characteristic of the driving circuit; and a phase adjusting circuit for correcting a shift of the phase of the exciting signal in accordance with a measurement by the measuring means.

21. An ultrasonic wave motor driving device as claimed in claim 20; further comprising a signal generating circuit for generating a start signal for starting the driving circuit and a stop signal for stopping the driving circuit.

22. An electronic apparatus comprising: an ultrasonic wave motor device comprised of an oscillating body having a piezo-electric element, a moving body movably disposed on the oscillating body, a driving circuit for oscillating the oscillating body by an exciting signal and performing amplification and phase setting of the exciting signal, measuring means for measuring a characteristic of the driving circuit or a characteristic of the oscillating body, and a phase adjusting circuit for correcting a shift of the phase of the exciting signal set by the driving circuit in accordance with a measurement by the measuring means; an output mechanism; and a transmitting mechanism for transmitting movement of the moving body to the output mechanism.

23. An electronic apparatus as claimed in claim 22; wherein the driving circuit comprises an amplifying circuit for amplifying the exciting signal and a phase setting circuit for setting a phase of the exciting signal amplified by the amplifying circuit.

24. An ultrasonic wave motor device comprising: a piezo-electric element; a vibrating member electrically connected to the piezo-electric element to be vibrationally driven thereby; driving circuit means for inputting a driving signal to the piezo-electric element to vibrate the vibrating member, amplifying the driving signal, and setting a phase of the amplified driving signal; measuring means for measuring a characteristic of the driving circuit means; and phase adjusting means for correcting a shift of the phase of the driving signal in accordance with a measurement by the measuring means.

25. An ultrasonic wave motor device as claimed in claim 24; wherein the driving circuit means comprises an amplifying circuit for amplifying the driving signal and a phase setting circuit for setting a phase of the driving signal amplified by the amplifying circuit.

26. An ultrasonic wave motor device as claimed in claim 25; wherein the piezo-electric element has an electrode pattern; and further comprising a boosting circuit for boosting an output voltage of the amplifying circuit and applying the boosted output voltage to the electrode pattern of the piezoelectric element to vibrationally drive the vibrating body.

27. An ultrasonic wave motor device as claimed in claim 26; further comprising a signal generating circuit for generating a start signal for starting the driving circuit means and a stop signal for stopping the driving circuit means.

28. An ultrasonic wave motor device as claimed in claim 25; further comprising a moving member movably disposed on the vibrating member, and a pressure-regulating member for urging the moving member into pressure contact with the vibrating member.

29. An electronic apparatus comprising: an ultrasonic wave motor device as claimed in claim 37; an output mechanism; and a transmitting mechanism for transmitting movement of the moving body to the output mechanism.

* * * * *